Figure 1:
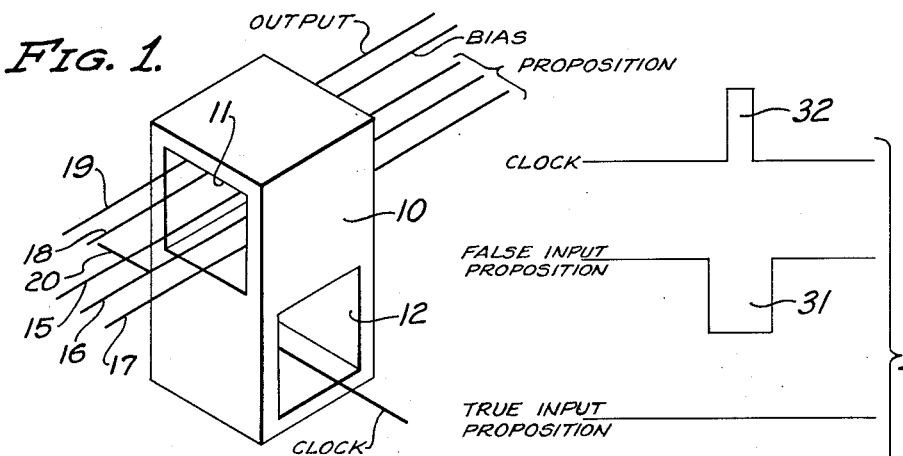

Oct. 30, 1962    C. L. WANLASS    3,061,820
GATING CIRCUIT
Filed Dec. 19, 1958

INVENTOR
CRAVENS L. WANLASS

BY HIS ATTORNEYS
HARRIS, KIECH, FOSTER & HARRIS

United States Patent Office 3,061,820
Patented Oct. 30, 1962

3,061,820
GATING CIRCUIT
Cravens L. Wanlass, Woodland Hills, Calif., assignor, by mesne assignments, to Ford Motor Company, Dearborn, Mich., a corporation of Delaware
Filed Dec. 19, 1958, Ser. No. 781,594
3 Claims. (Cl. 340—174)

This invention relates to gating circuits suitable for use in instrumenting logic systems and, in particular, to gating circuits utilizing orthogonal magnetic fields such as those described in my copending application entitled "Logic System Gating Circuit," Serial No. 689,622, filed October 11, 1957.

Most gating circuits provide a pulse and no-pulse output for indicating true and false propositions. However, it is often desirable to have gating circuits which provide a polarized output, i.e., pulses for both conditions with the polarity of the output indicating whether the proposition of the circuit is true or false. Accordingly, it is an object of the invention to provide a polarity type gating circuit utilizing orthogonal magnetic fields.

It is an object of the invention to provide an orthogonal field gating circuit wherein the magnetic material around the output axis is maintained in either of two magnetic induction states so that the clock or sense pulses along the perpendicular axis will always produce a flux change and an output pulse. Another object is to provide such a circuit which can be used with square hysteresis loop magnetic material and with nonsquare loop material. A further object is to provide such a circuit wherein the nonsquare loop material is maintained in one state by a bias current and is changed to the other state by the input propositions. Another object is to provide such a circuit wherein the input propositions are in the form of current pulses which are generated prior to and maintained throughout the duration of the clock pulses. A further object is to provide such a circuit wherein the square loop material is set to one state and is changed to the other state by a proposition pulse of a particular polarity prior to the clock pulse.

It is an object of the invention to provide such a gating circuit wherein the output is independent of the polarity of the clock pulse. A further object is to provide such a gating circuit having low input proposition current requirements. This object is achieved in the present invention which does not rely upon saturation of the magnetic material, merely calling for a change in polarity of the magnetic induction state of the material.

It is an object of the invention to provide a gating circuit including a block of magnetic material, a plurality of proposition conductors and an output conductor passing through said block along a first axis, a clock conductor passing through said block along a second axis perpendicular to the first axis, and means for establishing a magnetic induction state of one polarity in said material along said first axis. Another object is to provide such a circuit including a bias conductor passing through said block along the first axis with a source of bias current connected thereto for establishing the magnetic induction state of the one polarity. A further object is to provide such a circuit including means for applying a clock current pulse of a given duration to the clock conductor and means for applying input current pulses to selected ones of the proposition conductors, with each of the input current pulses being of a magnitude and polarity to change the magnetic induction state along the first axis to the opposite polarity, and with the input current pulses beginning prior to and extending over the duration of the clock current pulse. A further object is to provide such a circuit including means coupled to the output conductor for sensing currents generated in the output conductor by the action of the clock current pulse.

It is an object of the invention to provide an orthogonal field gating circuit of the type referred to above which may be used either as an and gate or as an or gate. A further object is to provide a gating circuit which can be combined with a plurality of other gating circuits in the same manner as the circuits of my aforesaid copending application. Another object is to provide a gating circuit which can be manufactured in the same form and manner as the gating circuits of my aforesaid copending application.

Other objects, advantages, features and results of the invention will more fully appear in the course of the following description. The drawing merely shows and the description merely describes an embodiment which is given by way of illustration or example.

Figure 2:
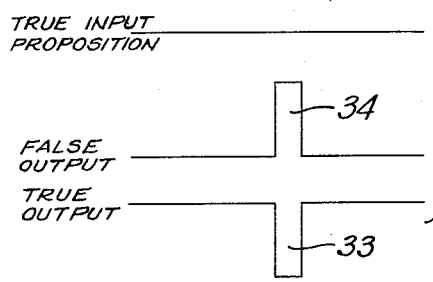
Figure 3:
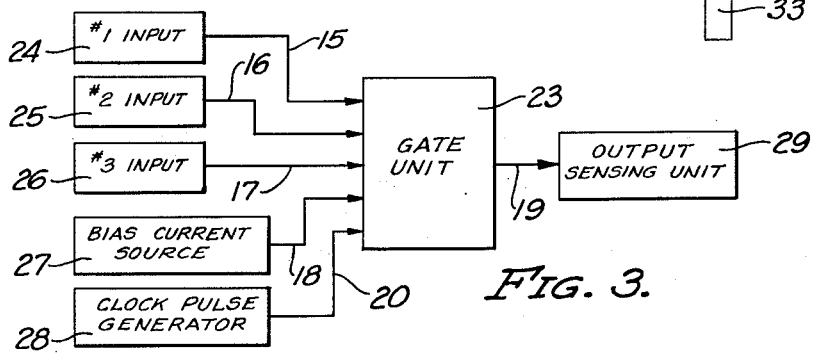
Figure 4:
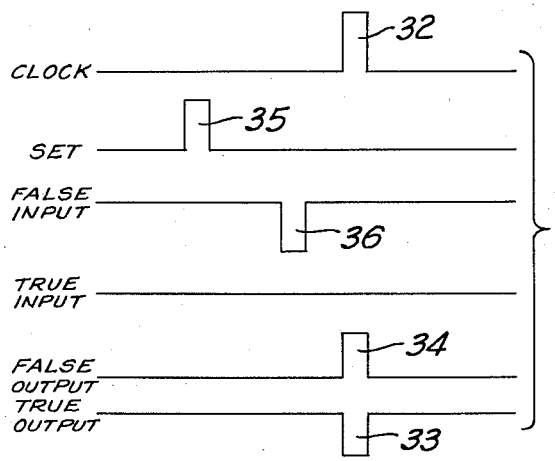

In the drawing:
FIG. 1 is an isometric view of a preferred form of the invention;
FIG. 2 is a graph showing the relation of the various pulses applied to the gating circuit when used as an and gate with nonsquare loop magnetic material;
FIG. 3 is a block diagram of a circuit employing the invention; and
FIG. 4 is a graph similar to that of FIG. 2 for square loop magnetic material.

In the description of the gating circuit of the invention, the terms "true" and "false" are used in their conventional logic sense. When all of the input propositions to an and gate are true, the output of the gate will be true. If one or more of the input propositions are false, the output of the and gate will be false. When one or more of the input propositions to an or gate are true, the output of the gate will be true. When all of the input propositions to the or gate are false, the output will be false.

Referring now to FIG. 1, a block of magnetic material is provided with opening 11, 12 which pass therethrough prependicular to each other. Material having a nonsquare hysteresis loop or material having a square hysteresis loop may be used in the polarity gating circuit of the invention. The following description will first relate to the nonsquare loop material.

A plurality of conductors are passed through the block with one of the conductors perpendicular to the others. In the unit of FIG. 1, proposition or input conductors 15, 16, 17, a bias conductor 18, and an output or read conductor 19 are positioned in the opening 11 and a clock or sense conductor 20 is positioned in the opening 12. Any number of proposition conductors may be utilized, the particular number for each unit depending upon the particular logical expression being handled.

The diagram of FIG. 3 indicates how the gating circuit of the invention may be operated in a logical system. A gate unit 23 such as is shown in FIG. 1 has input sources 24, 25 and 26 connected to the proposition conductors 15, 16 and 17, respectively, a bias current source 27 connected to the bias conductor 18, a clock pulse generator 28 connected to the clock conductor 20, and an output sensing unit 29 connected to the output conductor 19.

The output of the gating circuit is dependent upon the magnetic induction state of the magnetic material around the output conductor 19. Means are provided for establishing a magnetic induction state of one polarity in the magnetic material around the output conductor. For the purposes of the following discussion, this bias state will be considered positive. It should be noted that there is no requirement for the material to be saturated. It should also be noted that the choice of positive polarity for the bias induction state is arbitrary and the gating circuit will operate equally well with a negative bias polarity. However, the polarities of the output signals are dependent upon the polarity of the bias and, therefore, the latter is chosen to provide the desired output polarities.

In the unit of FIG. 1, the bias magnetic induction state is maintained by a current from the bias current source 27 through the bias conductor 18. The bias current will ordinarily be D.C., but could be A.C. or pulsed so long as the desired magnetic induction state is maintained during the operating period of the circuit.

With the bias source providing a positive magnetic induction state around the output conductor, the unit is operated as an and gate in the following manner. The true state for an input is a no current condition as shown in the diagram of FIG. 2. The false state of an input is a current condition, ordinarily a current pulse 31 as shown in FIG. 2. The polarity and magnitude of the false input current are such as to change the induction state of the magnetic material around the output conductor to the opposite state, i.e., to negative magnetic induction. Hence, the false proposition input currents need be only of a magnitude sufficient to overcome the effect of the bias current and may be quite small relative to that necessary to produce saturation.

Now consider the situation when all inputs to the and gate are true, i.e., no proposition current pulses. The clock pulse generator 28 produces a clock current pulse 32, such as shown in FIG. 2, on the clock conductor 20, which current pulse produces a pulse of magnetic flux in the magnetic material around the clock conductor. The flux produced by the clock current pulse will cause interference with the flux around the output conductor due to the orthogonal relationship of the two magnetic fields. There will be a decrease in the positive magnetic induction around the output conductor, followed by an increase when the clock current terminates. This change in magnetic induction will induce a current pulse 33 on the output conductor which, since it starts with a negative going induction change, will be a negative output. Hence, a negative output on the output conductor 19 corresponding in time to the clock pulse 32 indicates that all of the input propositions to the and gate are true.

If one of the input propositions is false, the input current will change the material around the output conductor to the negative induction state so that when the clock pulse 32 is applied, the flux change around the output conductor will be from the negative induction state toward zero, producing a positive going flux change and a positive output pulse 34. Hence, a positive output on the output conductor concurrent in time with the clock pulse indicates that one or more of the input propositions for the and gate are false. Of course, the output sensing unit 29 will preferably be blanked or deactivated except for the duration of the clock pulse so that the magnetic induction changes associated with the rise and fall of the false proposition current pulses do not produce outputs.

Since the output of the unit is produced by a change toward zero from the positive or negative induction state resulting from the orthogonal flux produced by the clock current pulse, it is seen that the output is independent of the polarity of the clock pulse and its resultant flux while being dependent upon the magnetic induction state of the material around the output conductor prior to the clock pulse.

In the orthogonal magnetic field system of the invention, there is no conventional magnetic coupling between the clock conductor and the perpendicularly disposed output and proposition conductors, i.e., there is no transformer action. However, there is a sharing of the magnetic material by the flux around the axis of the clock conductor and the flux around the axis of the output and proposition conductors. Hence, when there is some magnetic induction present along the output axis, the generation of magnetic induction along the clock axis tends to decrease the magnetic induction along the output axis because some of the magnetic domains are rotated more nearly parallel to the clock axis field. This causes a temporary decrease in the magnetic induction associated with the output axis, generating an output on the output conductor. However, this change in induction state along the output axis is temporary with the material returning to its previous state when the interfering orthogonal flux is removed.

The unit of FIG. 1 may be operated as an or gate in the following manner. A false proposition input will be the no-current state and a true proposition input will be the current state, which is the reverse of the situation for the and gate. Also, the positive output on the output conductor will indicate a true output while a negative output indicates a false output. Otherwise the operation of the or gating circuit is the same as that of the and gating circuit. For example, suppose that all input propositions are false. Then the material along the output axis will remain in the positive state produced by the bias current and the clock pulse will produce a negative output indicating that none of the input propositions are true. When an input proposition is true, there will be an input current pulse which changes the magnetic induction state to negative and the clock pulse produces a positive output, indicating that one or more of the input propositions are true.

The polarity type gating circuit of the invention may also use square loop magnetic material. Such material has a hysteresis curve in which the major loop crosses the H axis at substantially right angles so that the material has only two possible flux states, namely, positive and negative saturation. When square loop material is used in the circuit of the invention, it is not necessary that the bias current exist throughout the operating cycle nor that the input proposition pulses exist during the period of the clock pulse.

In the operation of the circuit with square loop material, the material around the output conductor 19 is first set to one magnetic induction saturation state, say the positive state. This may be accomplished by the bias current on the bias conductor 18 as described previously or by merely a current pulse 35 (FIG. 4) on the bias conductor or on any other conductor passing through the material parallel thereto.

First suppose that all inputs are true. When the clock pulse 32 arrives, the induction state of the material will be in the positive state as previously set and a negative pulse 33 will be produced on the output conductor 19, as in the previously described operation.

Now if one or more input propositions are false, the state of the material around the output conductor must be changed from the previously set positive state to the negative state. This may be accomplished by the input pulse 31 of FIG. 2 if desired. It is preferably performed by an input pulse 36 which follows the set pulse 35 and precedes the clock pulse 32. When using square loop material, there is no requirement that the input pulses be sustained during the clock pulse, since the material will remain in the saturation state it is last set to. Hence it is only necessary that an input pulse be of magnitude and duration sufficient to produce a change in state of the material.

Following a change in state produced by a false input pulse 36, the clock pulse 32 will produce a positive pulse 34 on the output conductor for a false output indication.

The gating circuit utilizing square loop material may be operated as an or gate by following the same procedure as with the nonsquare loop material.

It should be noted that the gating circuit of the present invention can be assembled and/or operated in conjunction with a plurality of similar gating circuits in the same manner as the gating circuits in my aforementioned copending application Serial No. 689,622. Also, the gating circuit of the present invention can be manufactured in the same form and in the same manner as the gating circuits of the aforesaid application.

While exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a gating circuit, the combination of: a unitary block of magnetic material having first and second openings therethrough substantially perpendicular to each other with a magnetic flux zone therebetween, a first flux path about the first opening, and a second flux path about the second opening intersecting and perpendicular to the first flux path in said zone; a bias conductor positioned in said first opening; means for coupling a current to said bias conductor for inducing a flux of a chosen polarity in said first path; at least one proposition conductor in said first opening; means for coupling a current to said proposition conductor for overcoming the bias current for changing the polarity of the magnetic flux in said first path; a clock conductor positioned in said second opening; means for coupling clock current pulses to said clock conductor for inducing flux pulses in said second path and contemporaneous flux swings in said first path with the polarity of flux change in said first path dependent on the flux state in said first path and independent of the polarity of the flux pulses in the second path; and an output device for sensing changes in the magnetic flux in said first path and developing an output current pulse for each clock current pulse.

2. In a gating circuit, the combination of: a unitary block of magnetic material having first and second openings therethrough substantially perpendicular to each other with a magnetic flux zone therebetween, a first flux path about the first opening, and a second flux path about the second opening intersecting and perpendicular to the first flux path in said zone; a bias conductor positioned in said first opening; means for coupling a steady state current to said bias conductor for inducing a flux of a chosen polarity in said first path; at least one proposition conductor in said first opening; means for coupling current pulses to said proposition conductor for overcoming the bias current and temporarily changing the polarity of the magnetic flux in said first path; a clock conductor positioned in said second opening; means for coupling clock current pulses to said clock conductor for inducing flux pulses in said second path and contemporaneous flux swings in said first path, with the proposition current pulses beginning prior to and extending over the duration of the corresponding clock current pulse, with the polarity of flux change in said first path dependent on the flux state in said first path and independent of the polarity of the flux pulses in the second path; and an output device for sensing changes in the magnetic flux in said first path and developing an output current pulse for each clock current pulse.

3. In a gating circuit, the combination of: a unitary block of magnetic material having first and second openings therethrough substantially perpendicular to each other with a magnetic flux zone therebetween, a first flux path about the first opening, and a second flux path about the second opening intersecting and perpendicular to the first flux path in said zone; a bias conductor positioned in said first opening; means for coupling a current pulse to said bias conductor for setting a saturation flux of a chosen polarity in said first path; at least one proposition conductor in said first opening; means for coupling a current pulse to said proposition conductor for changing the polarity of the flux saturation state in said first path; a clock conductor positioned in said second opening; means for coupling a clock current pulse to said clock conductor for inducing a flux pulse in said second path and a contemporaneous flux swing in said first path, with the clock pulse being timed to occur after any change in saturation state produced by a proposition current pulse, with the polarity of flux change in said first path dependent on the flux state in said first path and independent of the polarity of the flux pulses in the second path; and an output device for sensing changes in the magnetic flux in said first path and developing an output current pulse for each clock current pulse.

References Cited in the file of this patent

UNITED STATES PATENTS

| 2,810,901 | Crane | Oct. 22, 1957 |
| 2,811,710 | Demer | Oct. 29, 1957 |
| 2,905,834 | Arsenault | Sept. 22, 1959 |

OTHER REFERENCES

"Nondestructive Sensing of Magnetic Cores," Frank and Buck, Communications and Electronics, pp. 822–830, January 1954.